United States Patent [19]

Harvey et al.

[11] 4,410,429
[45] Oct. 18, 1983

[54] LINEAR POCKET ENERGY EXCHANGE DEVICE

[75] Inventors: Andrew C. Harvey, Waltham; John C. Harding, Sudbury, both of Mass.

[73] Assignee: Foster-Miller Associates, Waltham, Mass.

[21] Appl. No.: 254,779

[22] Filed: Apr. 16, 1981

Related U.S. Application Data

[63] Continuation-in-part of Ser. No. 166,445, Jul. 7, 1980, abandoned.

[51] Int. Cl.³ ............................................. B01D 31/00
[52] U.S. Cl. .............................. 210/416.1; 210/433.2
[58] Field of Search .............. 210/416.1, 321.1, 433.2, 210/652; 417/320, 321; 414/217

[56] References Cited

U.S. PATENT DOCUMENTS

| | | | |
|---|---|---|---|
| 1,048,737 | 12/1912 | Sallee | 417/320 |
| 3,489,159 | 1/1970 | Cheng et al. | 137/14 |
| 3,756,435 | 9/1973 | Steigerwald | 414/217 |
| 3,825,122 | 7/1974 | Taylor | 210/134 |

FOREIGN PATENT DOCUMENTS 2444740  4/1976  Fed. Rep. of Germany ...... 210/652

*Primary Examiner*—Frank A. Spear, Jr.
*Attorney, Agent, or Firm*—Wolf, Greenfield & Sacks

[57] ABSTRACT

An hydraulic energy recovery system for sea water desalinization reverse osmosis processes wherein a tube receives salt water at low pressure and a conveyor in the tube transports the low pressure liquid to a first station where the salt water is pressurized and fed to the desalinization process. The brine from the process is conveyed under pressure to a second station along the tube from which it is conveyed to a discharge. The first and second stations are maintained at high pressure, and the salt water at the inlet end and the brine at the outlet end cooperate with the conveyor to form labyrinth seals at each end of the tube so as to maintain the pressure at the first and second stations.

6 Claims, 3 Drawing Figures

LINEAR POCKET ENERGY EXCHANGE DEVICE

INTRODUCTION

This application is a continuation-in-part of our earlier copending application Ser. No. 166,445 filed July 7, 1980 entitled "Linear Pocket Energy Exchange Device", now abandoned.

This invention relates to hydraulic energy recovery systems. While the invention has many applications, it is particularly beneficial when associated with reverse osmosis desalinization processes. More particularly, the invention relates to a linear pocket feeder hydraulic energy recovery device. In the following specification the invention is described in terms of its application to the desalinization process, but the scope of the invention is not so limited.

Increasing energy costs have focused attention on the utilization of hydraulic energy recovery systems associated with reverse osmosis desalinization plants. Energy has always been a significant cost component of the total cost of desalted water. With the continuing rise in energy costs, there is a growing impetus to minimize these costs to the greatest practicable extent.

Primary interest in hydraulic energy recovery systems is centered on sea water reverse osmosis where operating pressures are high and larger volumes of pressurized waste brine are encountered. Economic justification for the installation of hydraulic energy recovery units in such an application can readily be made.

A usual characteristic of the reverse osmosis process is that a high pressure waste or reject fluid is throttled from high pressure to low pressure. The drop in hydraulic pressure represents a situation where a potential exists for recovery of this energy. From a practical viewpoint, there are two ways of capturing this waste energy. The first utilizes centrifugal devices such as hydraulic impulse turbines or reverse running centrifugal pumps. The second is based on positive displacement principles. This invention falls in the second category.

In the conversion of saline water to usable product water, 70% to 80% of the input stream which is pressurized is then discharged at pressure as concentrated brine. Work of course must be expended on the 20% to 30% of the input stream which passes through the membranes and becomes product water. But the discharged brine stream represents a waste of energy equivalent to 70% to 80% of the plant pumping costs.

There is tremendous potential to reduce power and operating cost requirements for desalinization by reverse osmosis with the application of effective hydraulic energy recovery systems. The impact of such devices can be illustrated with a simple example. If a 1000 psig operating pressure is assumed, an 87% pump efficiency, 30% product water, and a $0.03 Kwhr energy cost, then pump energy costs equals $0.83 per one thousand gallons of product water. The availability of a 90% efficient hydraulic energy system would reduce this cost to $0.27 per one thousand gallons of product water. In other words, product water energy costs would be reduced to one-third of the cost without energy recovery. On this basis, a 500 gallon per minute hydraulic energy recovery device would save $57,000 a year in energy costs, assuming a 90% duty cycle.

SUMMARY OF INVENTION

The hydraulic energy recovery device of the present invention is embodied in a tubular conveyor in which a series of sealed pockets are connected together and move through the tube. These pockets convey the low pressure salt water to the system and discharge the brine from the system to atmosphere. Along the tube, four stations are provided. In the first, low pressure salt water is fed to the tube, and the water with the pockets form labyrinth seals in the inlet end of the tube. The low pressure salt water is carried by the pockets to the second station where it is pressurized and then fed to the reverse osmosis desalinization process. The waste water or brine discharged from the process is fed to the tube at the third station under pressure. The second and third stations are pressurized with air or nitrogen to the desired pressure of the input to the process. The brine which is fed back to the tube in the third station is carried away by the pockets, and again the brine with the pockets form labyrinth seals at the discharge end of the tube. The labyrinth seals at the inlet and discharge ends of the tube preserve the high pressure at the second and third stations so as to minimize the energy cost of pumping air or nitrogen to those stations to maintain the necessary pressure. The brine is ultimately discharged from the tube to the atmosphere.

This invention will be better understood and appreciated from the following detailed description of one embodiment thereof, selected for purposes of illustration and shown in the accompanying drawing.

BRIEF FIGURE DESCRIPTION

DETAILED DESCRIPTION OF THE DRAWING

Figure 1:
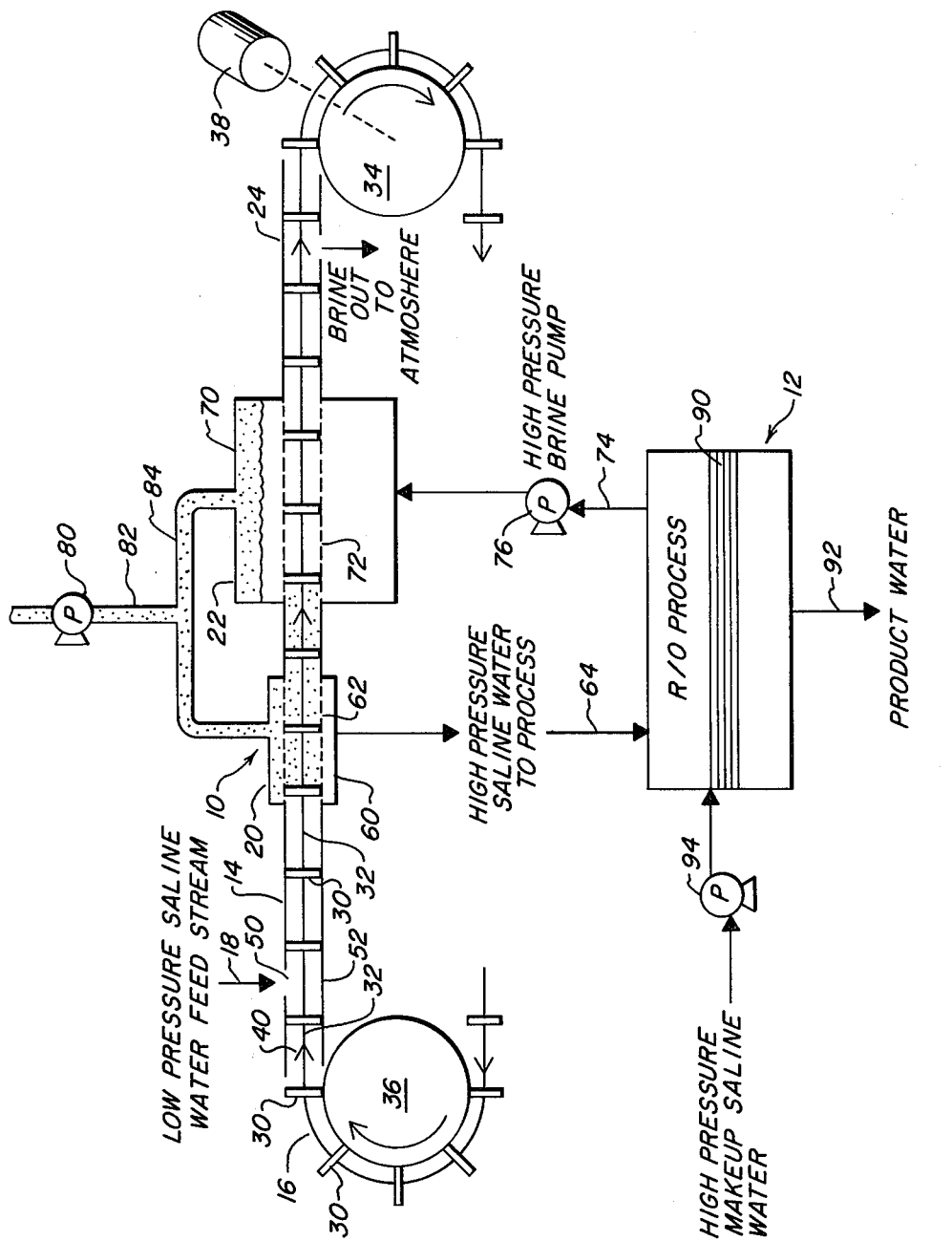
FIG. 1 is a diagramic view of the preferred embodiment of hydraulic energy recovery systems shown as applied to a reverse osmosis desalinization process.

The hydraulic energy recovery device 10 is shown in FIG. 1 of the drawing applied to a reverse osmosis desalinization process 12. The device 10 includes in its general organization a tube 14, conveyor 16 which travels through the tube, and four stations 18, 20, 22 and 24 along the tube. At station 18 low pressure sea water is introduced to the tube; at station 20 high pressure salt water is delivered from the tube to the desalinization process; at station 22 the waste product of the process is returned to the tube; and at station 24 the waste product (brine) is discharged to the atmosphere.

The tube 14 which ordinarily is round in cross-section is made of a non-corrosive and wear-resistant material and must, of course, be strong enough to withstand the pressure to which the system is subjected. Typically, that pressure may be in the order of 1000 psi. Conveyor 16 is made up of a series of circular pistons 30 connected together by a series of links 32 to form an endless loop supported on sprockets 34 and 36. Sprocket 34 may be motor driven as suggested at 38. The pistons may be provided with wear rings and should have a close tolerance with the inner surface of tube 14. Ideally, the tolerance between the wear rings and inner tube surface is in the order of 0.0015 to 0.002 inches. The adjacent pairs of pistons 30 form pockets 39 which move through the tube in the direction of arrow 40.

At the first station 18 the tube 14 is shown provided with an inlet opening 50 which of course schematically represents any form of feed system to the tube capable of introducing salt water at low pressure into it. The salt water in the pockets 39 with the pistons 30 form labyrinth seals at the inlet end 52 of the tube to maintain the pressure in the system in the region of the second and third stations 20 and 22, as is described in greater detail below.

At second station 20, the tube 14 passes through a high pressure chamber 60 which communicates with the interior of the tube through slots 62 in the tube wall. The salt water brought to station 20 within the pressurized chamber 60 is subjected to high pressure gas provided in the system as explained below. The high pressure water is fed by gravity to the desalinization process 12 by means of the duct 64.

Tube 14 at third station 22 passes through a second high pressure chamber 70, and the interior of the tube is in communication with the chamber 70 by means of slots 72 in the tube. The chamber 70 receives high pressure brine from the process 12 through duct 74 and high pressure pump 76.

The high pressure chambers 60 and 70 are pressurized by means of pump 80 and lines 82 and 84 with air or nitrogen gas, and duct 84 which joins the chambers 60 and 70 serves to equalize the pressure at the two stations. The pressure in the chambers 60 and 70 is maintained at the inlet pressure of the desalinization process. As is schematically shown in the drawing, the brine introduced into chamber 70 completely surrounds the conveyor tube 14, and the brine thus serves to displace any gas carried to the chamber 70 by the conveyor from the chamber 60. Duct 84 serves to return any of the gas coveyed to the chamber 70 back to chamber 60. Chamber 70 must be large enough to allow any gases brought to the chamber to bubble or rise in the brine so that it may, in turn, be returned to chamber 60. It is, of course, essential that the gas not be carried out of the system with the brine, as that would necessitate repressurizing the chambers 60 and 70 from source 80, 82 and reduce the cost effectiveness of the system.

At the fourth station 24, the brine introduced to the tube at station 22 is let down to atmospheric pressure and discharged. The brine may be discharged to an external reservoir or otherwise be disposed of.

As shown in the drawing, product water forced through the membranes 90 in the reverse osmosis process is discharged by duct 92. The process is provided with any make-up water that may be necessary, by pump 94. It is essential that the pressure of the water supplied by pump 94 be substantially that of the pressure of the water fed to the process from station 20 so as to force the water through the membrane 90 to achieve the desired desalinization.

The following theoretical design specifications are presented to enable the reader to better appreciate the invention. It is to be understood that these specifications are directly dictated by the size of the reverse osmosis process which itself does not constitute this invention. Moreover, the specifications of the various components of the system are dependent upon one another, and a change in one component may require a balancing change in another.

In designing a recovery system for use with a reverse osmosis process having the capacity to produce 100,000 gal/day of product water, the following assumptions may be made. The process output is approximately 70% brine and 30% product water. It will also be assumed that the hydraulic energy recovery system of this invention supplies 70% of the saline water at the first station 18, and the remaining 30% is supplied to the reverse osmosis process by the pump 94. These assumptions dictate a throughput for the recovery system of approximately 160 gal/min. The system may be designed to operate at a pressure of 1000 psig.

With the foregoing assumptions the inner diameter of tube 14 may be 3 inches. The chain formed by the pistons 30 and links 32 may be driven at a speed of 10 feet/sec. by the sprocket 34 and motor 38, and the pistons may be spaced 6 inches apart, center to center. The sprockets 34 and 36 may have a diameter of 3 feet. The overall length of the system may be approximately 23 feet. The pump 80 and its lines 82 and 84 may be required to supply pressurizing gas at the rate of 5-8 cu.ft./min. to replace the gas which dissolves in the liquid in the system and discharges with the brine at the fourth station 24. And the total power requirements for the system may be approximately 13-15 KW.

The theoretical specifications for reverse osmosis processes having product water outputs of 500,000 and 1,000,000 gal/day with the same assumptions of 70% and 30% for output of brine and product water and 70% input from the system, and with the same 1000 psig operating pressure are respectively as follows: inner tube diameter, 6.5 and 9.5 inches; chain speed, 10 ft./sec. each; piston spacing, 6.5 inches each; sprocket diameters, 3.5 ft and 4 ft; system length, 26 ft and 28 ft; pressurizing gas 25-40 cu. ft/min and 50-80 cu. ft./min.; and power requirements of 65-75 KW and 130-150 KW.

Figure 2:
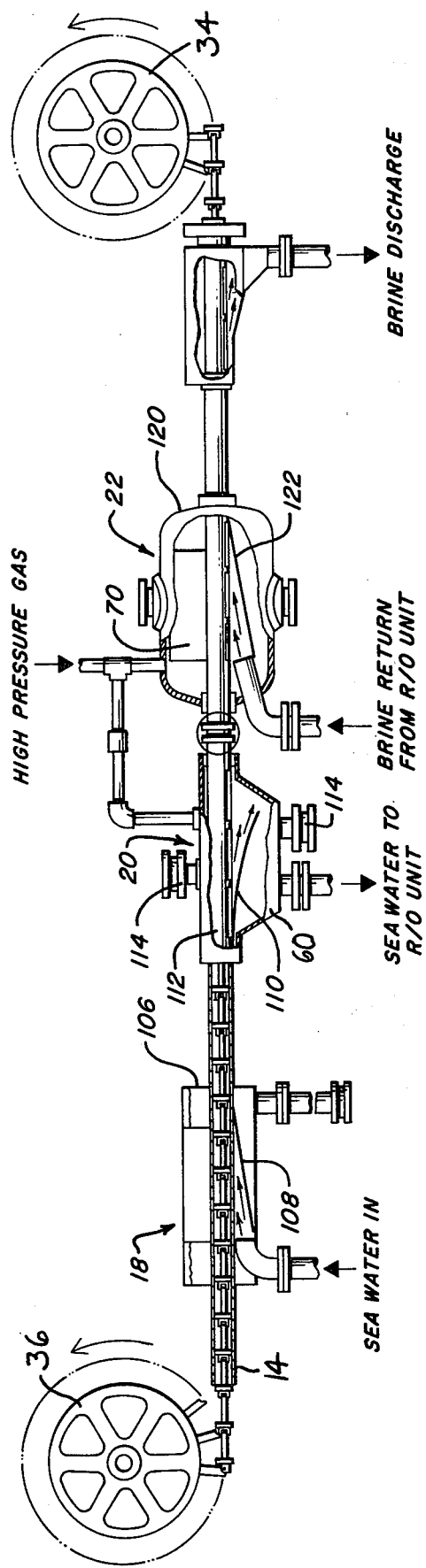
FIG. 2 is a pictorial side elevation view of one embodiment of the system illustrated in FIG. 1.
Figure 3:
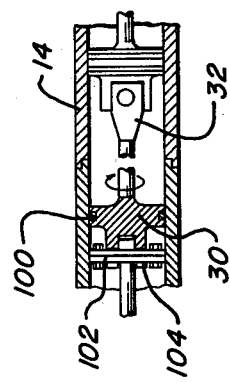
FIG. 3 is a detail of the conveyor used in the system shown in FIG. 2.

In FIGS. 2 and 3 a theoretical design of the machine is illustrated. The chain is composed of pistons 30 and links 32 and includes clearance seals 100. The pistons and links may be made of Alloy 20 Stainless Steel, and the seals may be made of polyacetal or polyimide resin. The links are connected to adjacent pistons by pins 102 which may bear on polymer bushings 104. The sprockets 34 and 36 may be made of Stainless Steel (SS 316).

The tube 14 which is corrosion and wear resistant may be made of the same material as the piston and link, and for proper strength may be made from solid bar stock. The tube 14 may be interiorly coated with an electroless nickel containing silicon carbide such as Nye Carb solid by Electro Coatings Company.

Station 18 is in the form of a nonload bearing box 106 through which the conveyor moves. Sea water may enter the box from below and the level of the water is maintained above the conveyor. Internal baffle 108 is provided to minimize turbulence.

The pressure chamber 60 in station 20 that surrounds tube 14 and discharges the brine to the reverse osmosis process may also be made of the same material as the conveyor pistons and links. A baffle 110 is provided in the housing 112 which minimizes turbulence, mixing and entrainment of gas. Ports 114 are provided for inspection of the interior of the chamber and for the insertion of control sensors. The device may be made from large pipe rolled from plate and welded.

The high pressure chamber 70 in station 22 through which pipe 14 passes and where the brine is recovered from the reverse osmosis process is similar to chamber 60. Its housing 120 may be made in the same fashion and from the same materials as housing 112. The housing 120 is larger than the housing 112 to allow adequate time to allow the brine to displace the gas in the chamber and allow the brine to completely surround the tube 14. Baffle 122 in the housing also reduces turbulence, mixing and gas entrainment.

At station 24 the tube 14 passes through a nonload bearing welded structure, which allows the brine to discharge with a mninimum of splashing.

The motor 38 for driving the conveyor may be electrically powered and of the type suitable for marine service. The motor should be of variable speed to enable the user to adjust the flow rate in the system to accommodate the requirements of the reverse osmosis process.

The invention as described above has many advantages. Principal among these is the fact that the system is inherently pressure balanced, that is, the forces resulting from the gas pressure on the chain conveyor are equal and opposite, and thus the only forces that the drive system must overcome are those due to friction between the piston seals and the walls of the tube. The machine uses redundant seals between the high pressure and low pressure regions so as to minimize water leakage and pressure leakage from the system. The labyrinth seals are most effective in this regard.

Having described this invention in detail, those skilled in the art will appreciate that numerous modifications may be made thereof without departing from this invention. Therefore, it is not intended that the scope of the invention be limited to the specific embodiment illustrated and described. Rather, the invention is to be determined by the appended claims and their equivalents.

What is claimed is:

1. An hydraulic energy recovery system for use with a reverse osmosis desalinization process which discharges product water and brine comprising
    a tube having an inlet for receiving low pressure salt water to be treated and an outlet for discharging brine,
    a conveyor having a course which travels through the tube from the inlet to the outlet and motor means for driving the conveyor,
    pocket means carried by the conveyor for conveying fluid,
    first and second high pressure chambers consecutively communicating with the tube intermediate the tube inlet and outlet,
    means including a pump for pressurizing said first and said second high-pressure chambers, said pressurizing means displacing low-pressure salt water from ones of said pocket means in said first high-pressure chamber and feeding the salt water to said desalinization process,
    means including a pump for transporting the brine under pressure from said desalinization process to the second high-pressure chamber and into ones of said pocket means located within said second high-pressure chamber,
    a duct connecting the first and second high-pressure chambers and communicating with said pressurizing means for equalizing the pressures in the second chamber and the first chamber.

2. A system as defined in claim 1 further characterized by
    said conveyor including a series of spaced apart pistons that have a tight clearance in the tube, each adjacent pair of said pistons forming the pocket means,
    and the pistons with the salt water at the inlet and the pistons with the brine at the outlet forming labyringth seals at the inlet and outlet of the tubes for preserving the pressure in the chambers.

3. An hydraulic energy recovery system comprising
    a tube having an inlet for receiving low pressure liquid to be processed,
    a conveyor including a series of pistons moving in the tube, said pistons forming pockets for moving the low pressure liquid in the tube, the pistons and low pressure liquid forming labyrinth seals at the inlet end of said tube,
    a first station in the tube for discharging into a process the liquid to be processed which has been introduced into the tube,
    means including a pump for pressurizing the liquid in the first station in the tube before it is discharged, said pressurizing means displacing the liquid from ones of the pockets of the conveyor within the first station for discharge of the liquid into the process,
    a second station in the tube for receiving under pressure a liquid by-product of the processed liquid, said liquid by-product being received by ones of the pockets within said second station, said second station also being pressurized by said pressurizing means,
    said liquid by-product forming with the pistons labyrinth seals in the tube downstream of the second station,
    means interconnecting said first station with said second station for equalizing the pressures therein,
    and means for discharging the liquid by-product from the tube to the atmosphere.

4. A system as defined in claim 3 further characterized by
    means for continuously moving the conveyor through the tube.

5. A system as defined in claim 3 further characterized by
    said first and second stations being pressure chambers which surround the tube at spaced points along the tube,
    openings in the tube within each station for establishing communication between the tubes and chambers,
    and means for feeding gas under pressure to said chambers for pressurizing the liquid in the first station,
    and a duct connecting the chambers for allowing gas in the second chamber to flow into the first chamber.

6. A system as defined in claim 5 further characterized by
    means for continuously moving the conveyor through the tubes.

* * * * *